United States Patent
Kimball et al.

(10) Patent No.: US 8,911,579 B2
(45) Date of Patent: Dec. 16, 2014

(54) FLUID MEDIUM NON-CONTACT CONSOLIDATION

(75) Inventors: Kurt J. Kimball, Barrington, NH (US); John R. Michasiow, Summit, NY (US); Robert J. Langone, Clifton Park, NY (US); Zachary A. August, Clifton Park, NY (US)

(73) Assignee: ADC Acquisition Company, Schenectady, NY (US)

( * ) Notice: Subject to any disclaimer, the term of this patent is extended or adjusted under 35 U.S.C. 154(b) by 195 days.

(21) Appl. No.: 13/537,198

(22) Filed: Jun. 29, 2012

(65) Prior Publication Data
US 2013/0000838 A1  Jan. 3, 2013

Related U.S. Application Data

(60) Provisional application No. 61/503,681, filed on Jul. 1, 2011.

(51) Int. Cl.
*B29C 70/00* (2006.01)
*B29C 70/38* (2006.01)

(52) U.S. Cl.
CPC ............... *B29C 70/00* (2013.01); *B29C 70/384* (2013.01)
USPC ................................ 156/166; 156/433; 156/441

(58) Field of Classification Search
CPC .................................................... B29C 70/384
USPC ......... 156/166, 173, 175, 425, 433, 441, 573, 156/523
See application file for complete search history.

(56) References Cited

U.S. PATENT DOCUMENTS

| | | | | |
|---|---|---|---|---|
| 4,859,267 A * | 8/1989 | Knoll | .......................... | 156/273.7 |
| 4,907,754 A | 3/1990 | Vaniglia | | |
| 5,045,147 A | 9/1991 | Benson et al. | | |
| 5,078,821 A * | 1/1992 | Garvey et al. | ................. | 156/282 |
| 5,290,389 A | 3/1994 | Shupe et al. | | |
| 5,447,586 A * | 9/1995 | Tam | ............................... | 156/64 |
| 6,588,475 B1 * | 7/2003 | Simon et al. | ................... | 156/359 |
| 6,899,777 B2 * | 5/2005 | Vaidyanathan et al. | ... | 156/89.11 |

\* cited by examiner

*Primary Examiner* — Jeff Aftergut
(74) *Attorney, Agent, or Firm* — Maxine L. Barasch; Keohane & D'Alessandro, PLLC (57) ABSTRACT

A pressure head for use in a fiber placement system for thermoplastic composite materials is disclosed. Plies of thermoplastic composite tape are placed onto a mandrel to form a shaped object. The pressure head includes a nozzle and at least one delivery tube for providing fluid medium mixture to the nozzle body, wherein the nozzle directs the fluid medium onto a surface of the shaped object thereby providing a pressure on the surface without direct physical contact of the nozzle with the plies of thermoplastic composite tape.

13 Claims, 9 Drawing Sheets

FLUID MEDIUM NON-CONTACT CONSOLIDATION

CROSS REFERENCE TO RELATED APPLICATIONS

This application claims priority to 61/503,681 filed on Jul. 1, 2011, and is incorporated herein by reference.

FIELD OF THE INVENTION

The present invention relates generally to the fabrication of parts comprised of composite materials, and more particularly, to a composite fiber placement apparatus and method.

BACKGROUND

Automated fiber placement machines provide tows onto a mold surface or mandrel to manufacture irregular shaped parts. These machines are described in U.S. Pat. Nos. 5,290,389, 4,907,754 and 5,045,147, incorporated by reference herein.

Currently, fiber placement heads provide a consolidation or compaction force through a contact roller or other mechanical device. However, there are drawbacks in using a contact roller or mechanical device to provide a compaction force on the tow when the tow is being applied to a non-uniform surface.

One challenge is that thermoplastic composite materials often have elevated processing temperatures in the range of 250 to 1000 degrees Celsius. A metallic consolidation roller is often required in order to withstand the processing temperatures. These rigid steel consolidation rollers have their respective limitations at being able to uniformly provide a consolidation pressure across the entire width of incoming material when placing over complex geometries. Therefore, it is desirable to have an improved fiber placement apparatus and method.

SUMMARY

Described herein is a pressure head for use in a fiber placement system for placing a plurality of tows. The tows are placed onto a mandrel to form a shaped object. The pressure head includes a nozzle and at least one delivery tube for providing a fluid medium mixture to the nozzle, wherein the nozzle directs the fluid medium onto a surface of the shaped object thereby providing a pressure on the surface above a predetermined amount. In some embodiments, the pressure provided ranges from about 50 psi to about 200 psi.

Also, described herein is a method for providing compaction on a shaped object. The method includes placing a plurality of tows onto a mandrel to form a shaped object and providing a fluid medium mixture onto a surface of the object at a pressure above a predetermined amount.

Further, described herein is a fiber placement system for placing a plurality of resin impregnated tows onto a mandrel to form a shaped object. The system includes a nozzle, at least one delivery tube for providing a fluid medium mixture to the nozzle body, wherein the nozzle directs the fluid medium onto a surface of the object, thereby providing a pressure on the surface above a predetermined amount, and optionally includes a heating device for applying heat to the placed fibers. Hence, embodiments of the present invention are suitable for fabricating thermoplastic composite materials.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale. The figures are merely schematic representations, not intended to portray specific parameters of the invention. The figures are intended to depict only typical embodiments of the invention, and therefore should not be considered as limiting the scope of the invention. In the figures, like numbering may represent like elements.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be utilized and that changes may be made without departing from the scope of the present teachings. The following description is, therefore, merely illustrative and not meant to be limiting.

The embodiments described herein provide a fluid compaction device that applies consolidation pressure without direct physical contact between the fluid compaction device and the surface of the thermoplastic composite fibers or tows positioned on a mandrel. The embodiments described herein apply a compaction force using a high pressure fluid medium through a nozzle that is positioned close to, but not in direct physical contact with the surface being compacted.

The embodiments provided herein use a high temperature/high pressure fluid to impart a compaction force on a surface of a part. The fluid can be, e.g., a supersonic plasma, a combusted gas mixture in the form of exhaust from a pulse jet, a combustible gas mixture, or any other suitable media now known or hereafter developed. The fluid can be an inert gas that has been heated. Note that for the purposes of this disclosure, the term "fluid" is used in a thermodynamics context, and applies to materials that may be in a gaseous or plasma state.

Disclosed herein is a non-contact consolidation device, system, and method. The non-contact consolidation device, system, and method involves using a fluid compaction medium that is reliable, able to provide the proper pressure, and does not contact the part being manufactured. The fluid medium is provided to the surface of the part through a nozzle. The nozzle does not have direct physical contact with the surface of the tape (tow). Computer software and mechanical hardware maintain the control of the fluid flow, thus providing the proper pressure on the surface of the tape.

Figure 1A:
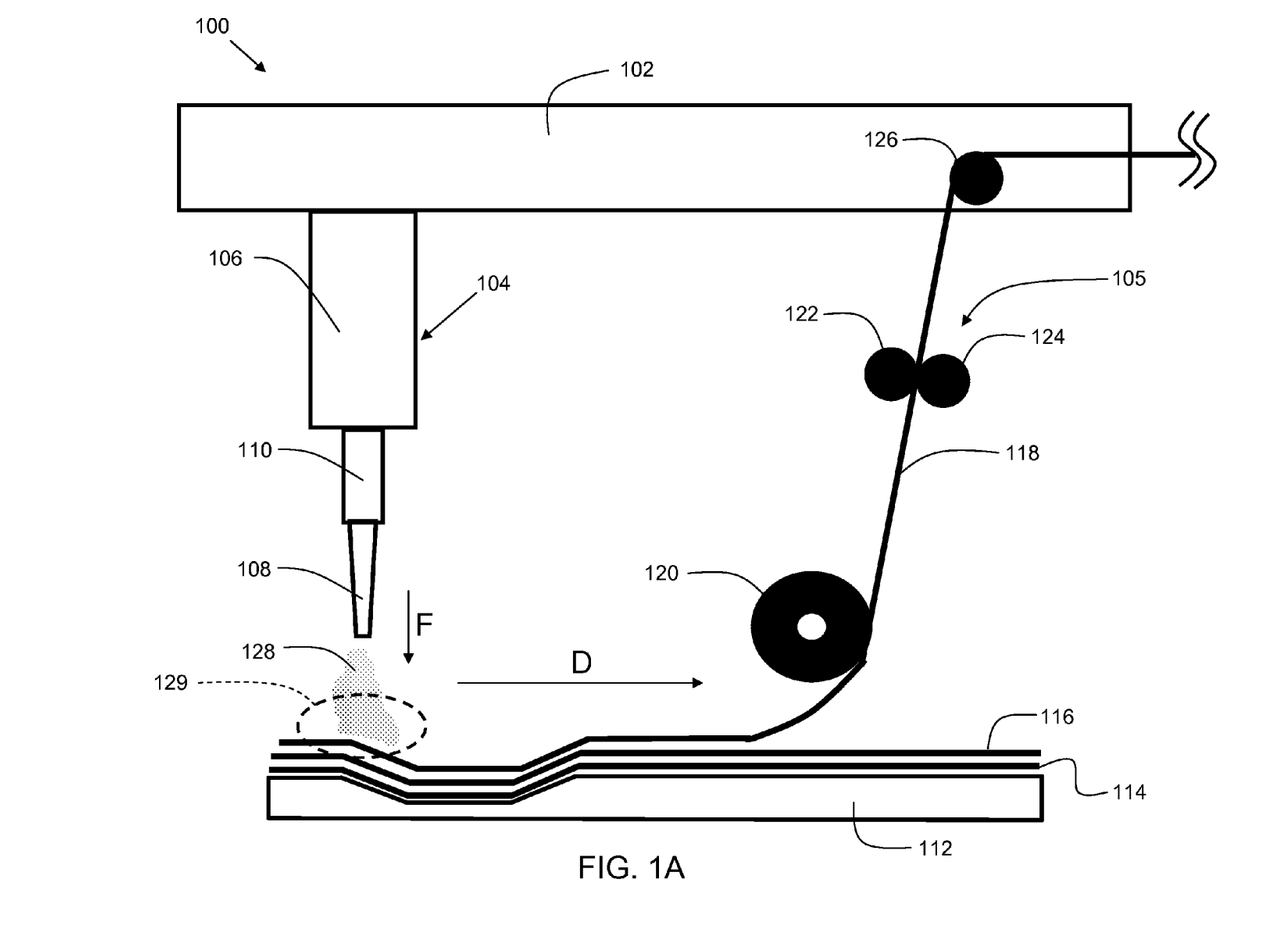
FIGS. 1A-1C show various embodiments of a composite fiber placement apparatus in accordance with an embodiment of the present invention.

FIG. 1A shows an embodiment of a composite fiber placement apparatus 100 in accordance with an embodiment of the present invention. Composite fiber placement apparatus 100 comprises a fluid compaction device in the form of a pulse detonation engine 104. Pulse detonation engine 104 is mounted to gantry 102. Gantry 102 also comprises a tape feed mechanism 105 which is comprised of feed rollers 122 and 124, and guide rollers 126 and 120, which serve to guide tape 118 as it is being applied on a mandrel 112. The gantry 102 moves in a direction D to apply tape 118 to the mandrel. As shown, there are two previously applied tape plies 114 and 116. Tape ply 118 is currently being applied over underlying tape ply 116.

The pulse detonation engine (PDE) 104 is comprised of a body 106, a diffuser 110, and a nozzle 108. Exhaust gas 128 is output from the nozzle 108 and exerts a downward force F in the force zone 129 on the tape ply 118. The force zone 129 is the region in sufficiently close proximity to the nozzle 108 such that the force F exerted by the fluid compaction device (PDE) 104 within the force zone 129 adheres the dispensed thermoplastic tape ply (layer) 118 to an underlying tape ply (layer) 114 without direct physical contact between the fluid compaction device and the dispensed thermoplastic tape. Hence, the exhaust gas replaces a physical compaction device, such as a metal roller, and compacts tape ply 118 without the need for direct physical contact with tape ply 118. This provides advantages for compaction over complex surfaces such as curves and corners, since the exhaust gas exerts a more conformal force than is possible with metal rollers. Due to the high temperatures at which thermoplastic tapes are applied, the use of flexible rollers is not feasible, since they cannot withstand such temperatures.

Figure 1B:
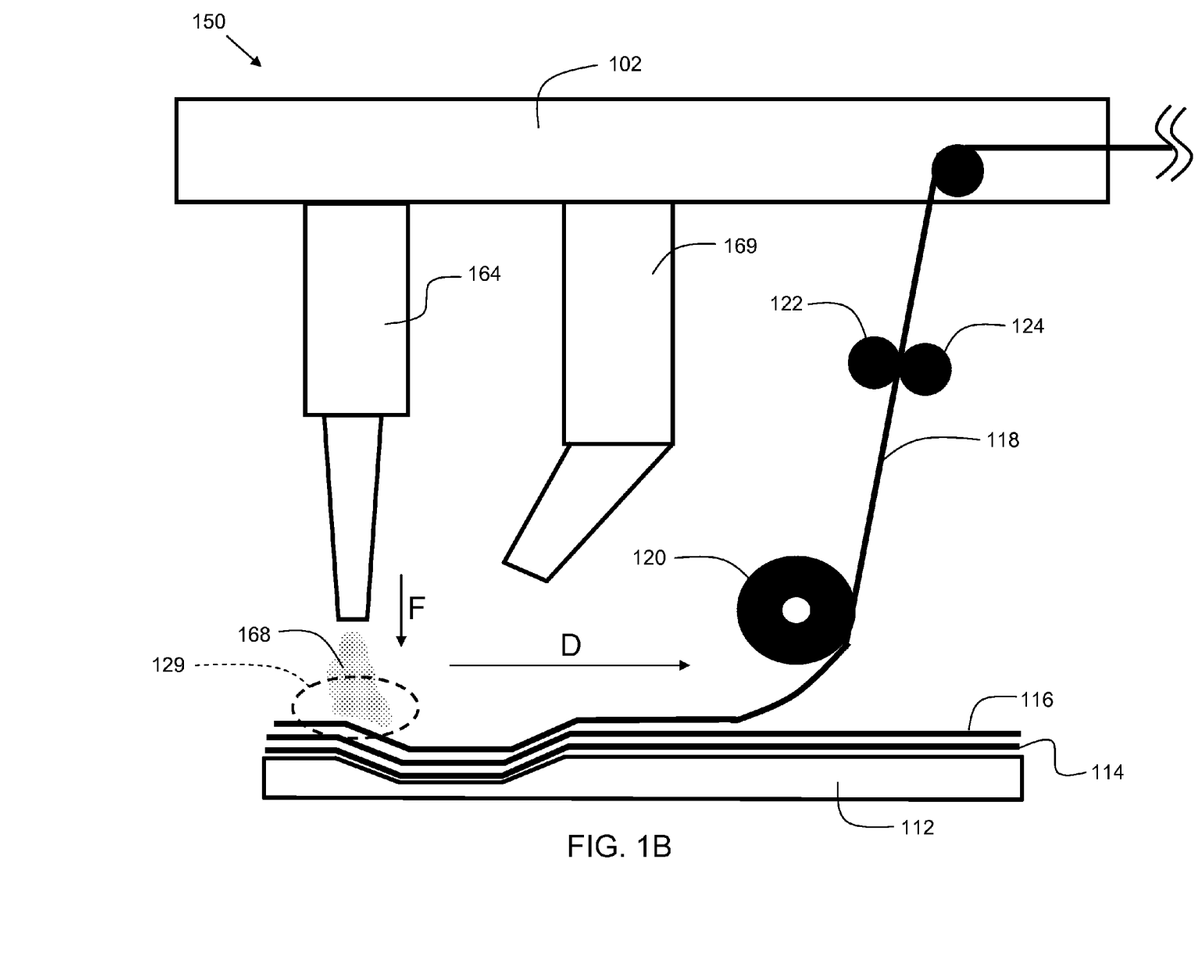

FIG. 1B shows an embodiment of a composite fiber placement apparatus 150 in accordance with another embodiment of the present invention. Composite fiber placement apparatus 150 comprises a pressurized gas source 164. The pressurized gas may be an inert gas such as nitrogen or argon. The output pressurized gas 168 exerts a force F on tape ply 118 to perform compaction, with a principle similar to that explained for the embodiment of FIG. 1A. However, with this embodiment, an external heat source 169 is also affixed to gantry 102, and applies heat to the force zone 129. In one embodiment, external heat source 169 comprises a hot gas torch.

Figure 1C:
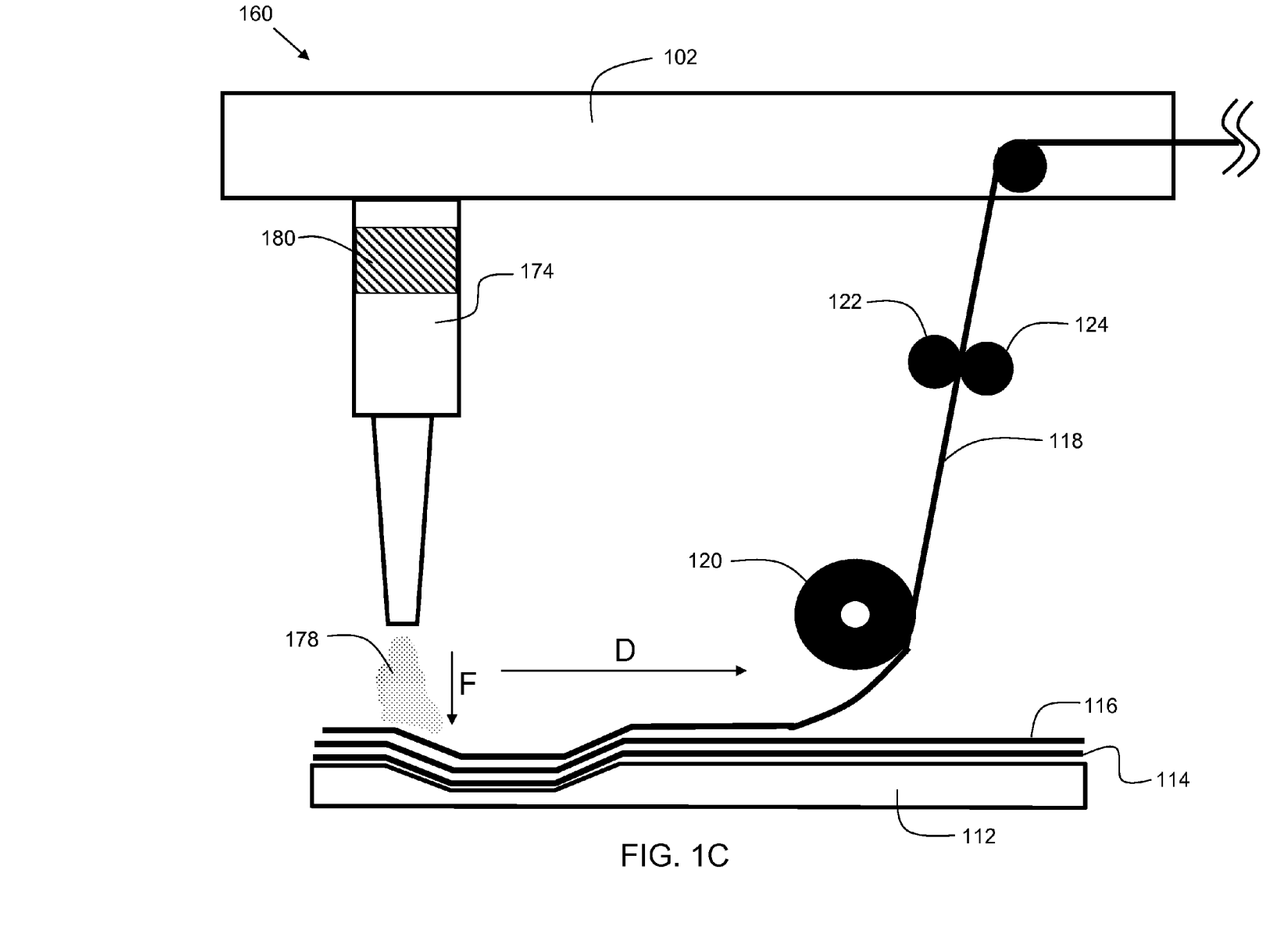

FIG. 1C shows an embodiment of a composite fiber placement apparatus 160 in accordance with another embodiment of the present invention. Composite fiber placement apparatus 160 comprises a pressurized gas source 174. The pressurized gas may be an inert gas such as nitrogen or argon. The output pressurized gas 178 exerts a force F on tape ply 118 to perform compaction, with a principle similar to that explained for the embodiment of FIG. 1B. However, with this embodiment, an internal heat source 180 heats the pressurized gas 178 prior to application to tape ply 118. In one embodiment, internal heat source 180 is an electric filament heater. In another embodiment, internal heat source 180 is a gas heater. In still another embodiment, it is a combusting mixture that expels a jet of combustion byproducts in a continuous manner.

Figure 2:
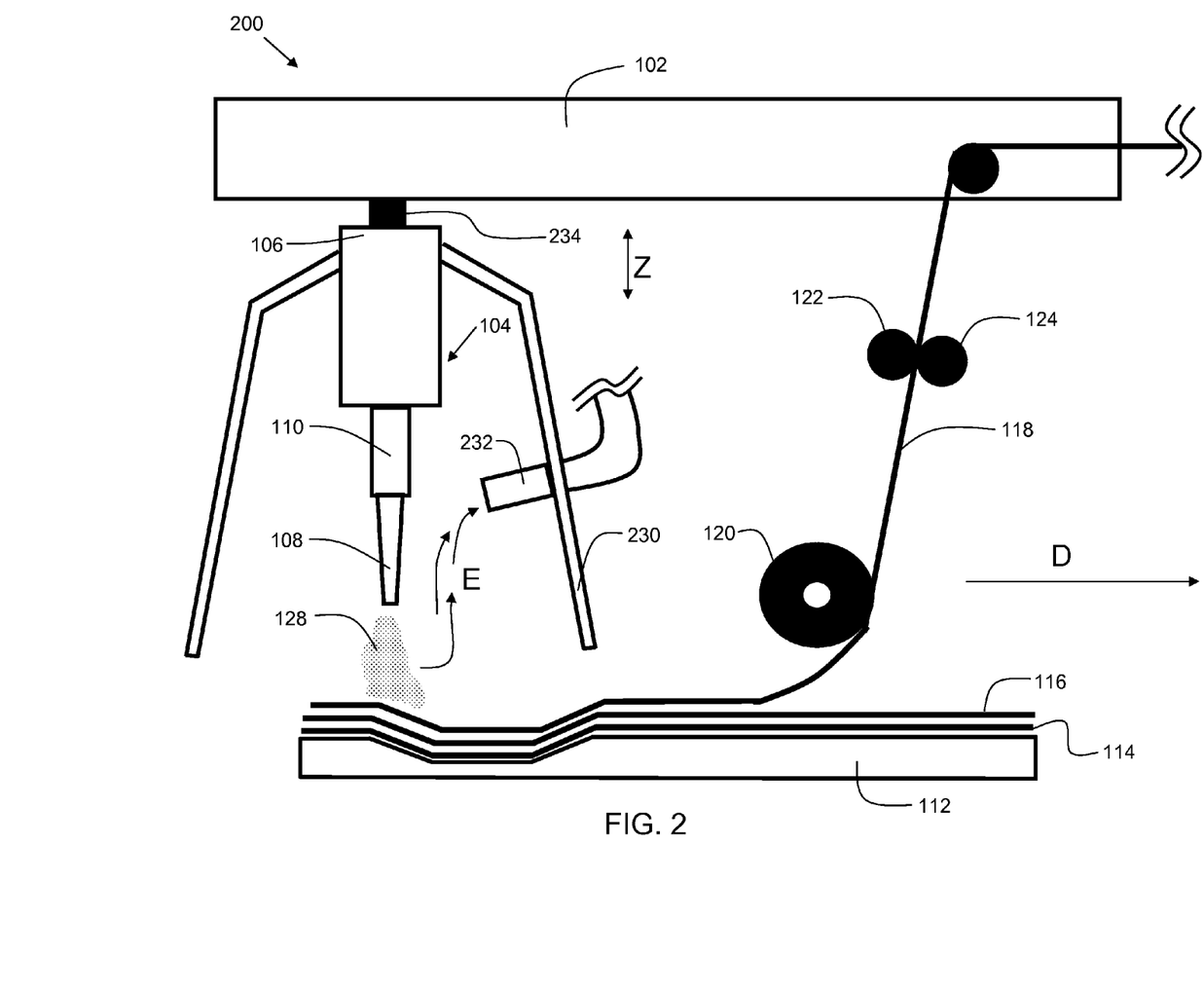
FIG. 2 shows an alternative embodiment of a composite fiber placement apparatus in accordance with a pulse detonation engine embodiment of the present invention.

FIG. 2 shows an alternative embodiment of a composite fiber placement apparatus 200 in accordance with a pulse detonation engine embodiment of the present invention. Fiber placement apparatus 200 comprises a pulse detonation engine 104. Suitable pulse detonation engines are known. One such pulse detonation engine is available from ENIGMATICS INC, of College Park, Md. Fiber placement apparatus 200 is similar to fiber placement apparatus 100, with the addition of a shroud 230. Shroud 230 serves to help reduce noise generated by the PDE 104 while the apparatus 200 is in use. Optionally, an exhaust gas removal duct 232 may be disposed within the shroud 230 to remove exhaust gas E and vent it to a safe area (e.g. outdoors). Optionally, an adjustable Z-axis support 234 may be used to move the fluid compaction device (FCD) in a vertical direction to maintain a predetermined distance between the fluid compaction device and dispensed thermoplastic tape ply 118. That is, to provide for control of the vertical distance between the nozzle 108 and the tape ply 118.

Figure 3:
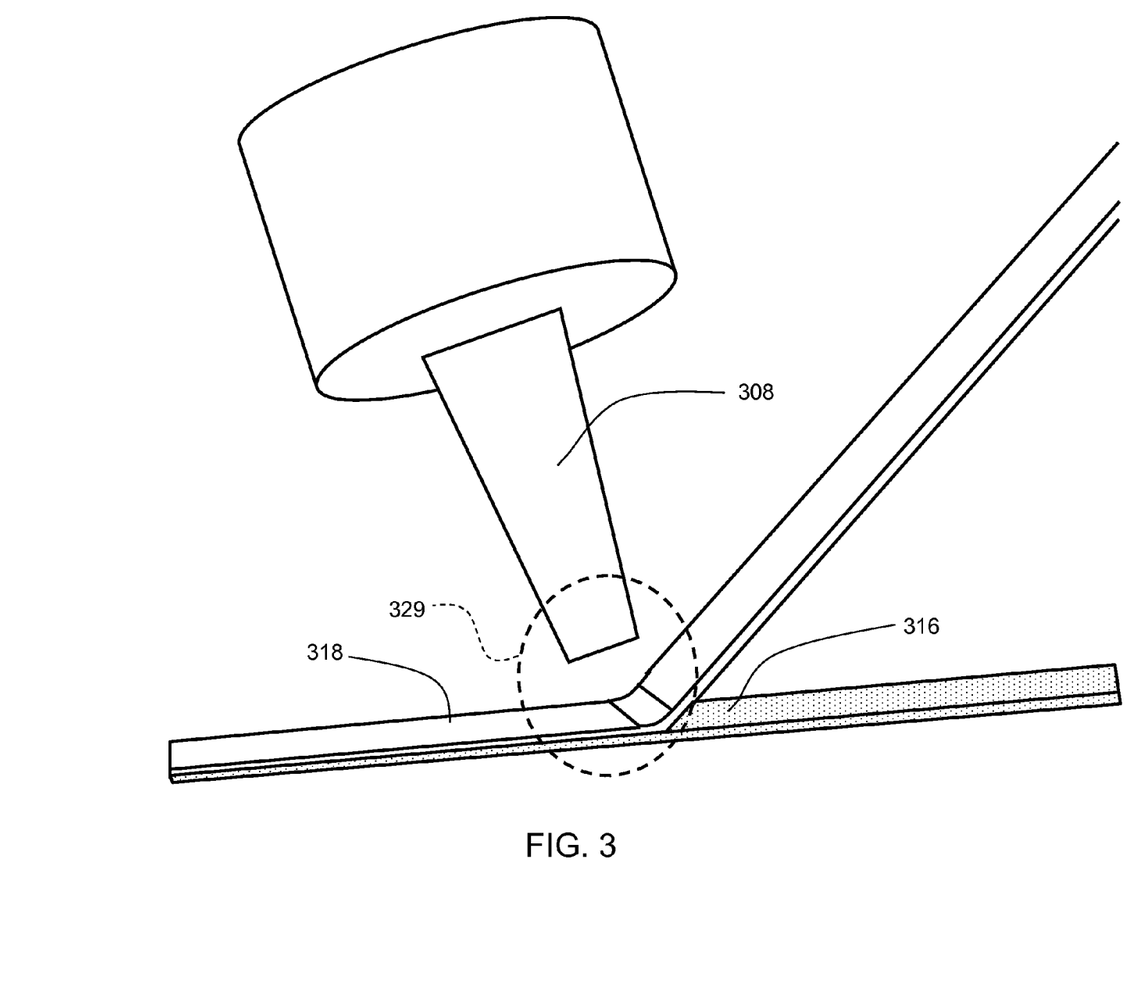
FIG. 3 shows details of a compaction nozzle.

Shown in FIG. 3 is a schematic representation of a non-contact compaction device. The nozzle 308 directs a fluid medium (not shown) onto a tow 318 (or resin impregnated tape ply) which is being applied to an underlying (previously applied) ply 316 of similar tape. The fluid medium is applied within the force zone 329, in which the tape ply 318 is passed through, hence compacting it onto the underlying ply 316. The tows 318 are placed on a mandrel as described above for FIG. 1A. The nozzle 308 can be made of any suitable material able to withstand the heat and pressure of the fluid medium. Typical materials include ceramic and metal. In some embodiments, nozzle 308 is a compressed gas output nozzle which supplies gas from a compressed gas source such as a compressed gas tank and/or a pump system and/or continuous combustion source (not shown). Hence, some embodiments of the present invention do not utilize a PDE. In other embodiments, nozzle 308 is the output of a PDE.

Figure 4:
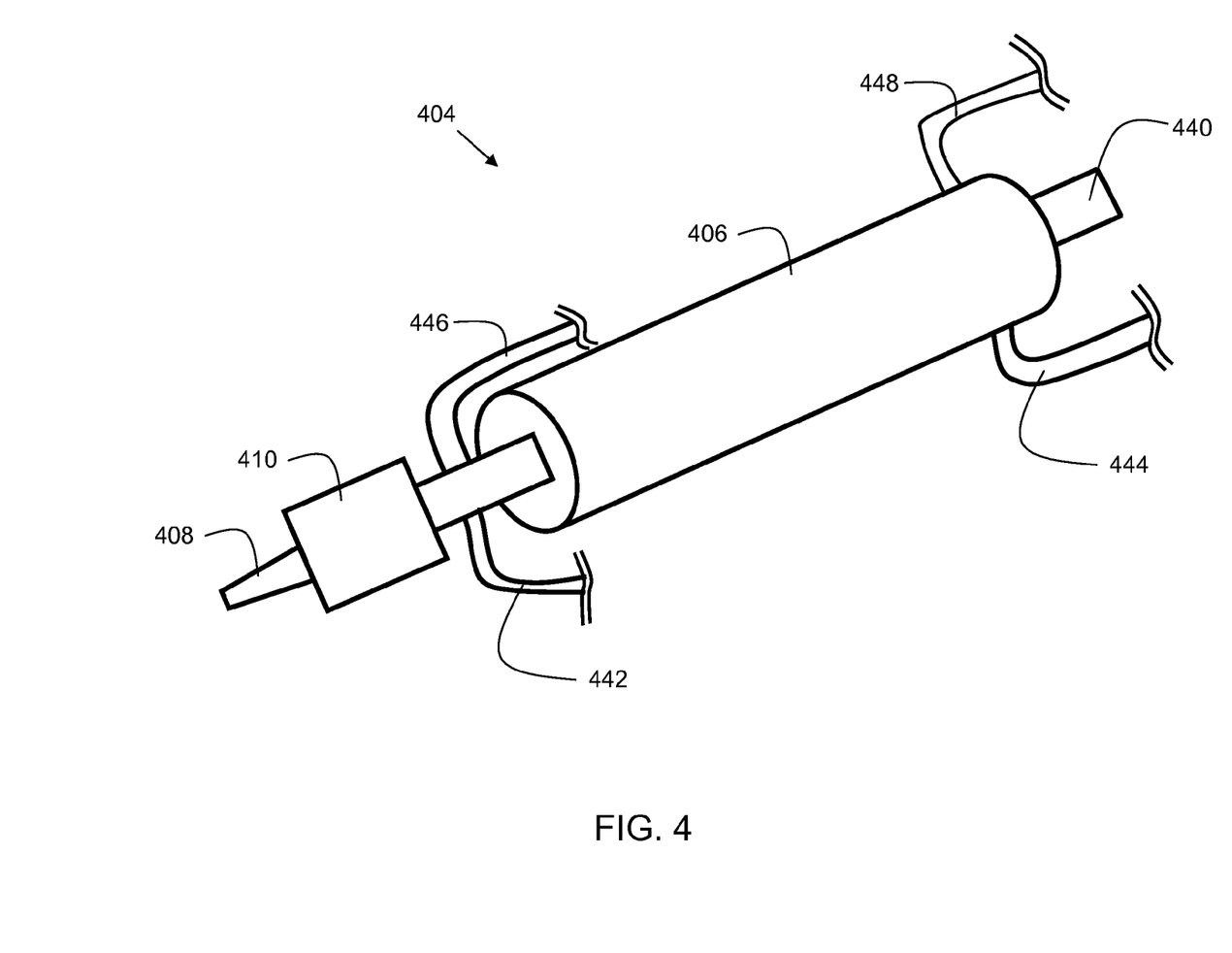
FIG. 4 shows additional details of a compaction nozzle.

Shown in FIG. 4 is a more detailed view of the fluid medium compaction device. The compaction device 404 includes nozzle 408, diffuser 410, and at least one fluid medium supply tube 448 or pipe for delivering the fluid medium at the proper amount and pressure. Control of the fluid to the nozzle 408 is through the supply tube 448. An ignition head 440 is provided to ignite the fluid if it is a combustible gas mixture. An air supply line 444 may be used to supply oxygen to facilitate combustion of the fluid medium (fuel). In such a configuration, the fluid compaction device is referred to as a pulse detonation engine (PDE). A heater (see 180 of FIG. 1C), rather than an ignition head 440 can be used to increase the temperature of the fluid medium if the fluid medium is inert. A water or other coolant line 442 may be used to supply coolant to keep the fluid delivery device 404 from overheating. An air line 446 may also be used to provide additional cooling.

Fiber compaction in mechanically compacted tape machines may utilize a compaction force of about 50 pounds per linear inch (lbs/in) to about 300 (lbs/in), or any other suitable compaction force, in order to consolidate the thermoplastic composite material. In order to achieve sufficient compaction force using a fluid medium, high fluid pressures and/or high fluid velocities may be used. High fluid pressures in the range of 3000 to 3500 psi or more may be used, and translate to high flow rates. It will be recognized that the invention is not limited to this range of flow rates, and includes any suitable flow rate. High fluid velocities may be achieved using high temperature fluids. High temperatures, such as, for example, ranging from 250 degrees Celsius to 1000 degrees Celcius, are generally advantageous since thermoplastic materials often must be heated before consolidation. The consolidation fluid medium in the embodiment described may serve to supply some or all of the required heat.

In some embodiments, the fluid is a supersonic plasma such as generated in a high temperature and pressure chemical reaction or electric arc. In some embodiments, the fluid medium can be the exhaust gas output from a pulse jet, or a combustible gas mixture such as acetylene/oxygen, methane oxygen or any suitable combination of fuel and oxidizing agent. In some embodiments, the fluid medium is an explosive gas mixture. Using a combustible gas mixture, the gas entering the body 406 combusts or "explodes" creating additional pressure and heat. In such embodiments, an igniter may be required. In some embodiments, an electric arc could be used to create high temperature and pressure plasma pulses or continuous jets. Using such electric arc plasmas, combustible gas mixtures are not necessary and inert gasses such as nitrogen, helium or argon could be used.

In some embodiments, a fluid medium compaction device is provided that applies consolidation pressure without contacting the surface during thermoplastic composite fiber placement.

In some embodiments, a fluid medium compaction device is provided that applies compaction force using a high pressure fluid medium through a nozzle that is positioned very close to, but not in contact with, the surface being compacted.

In some embodiments, a fluid medium compaction device is provided that applies compaction force using a high temperature/pressure fluid to impart a compaction force to the surface such as a supersonic plasma, pulse jet, chemical or combustible gas rocket, or any other suitable means.

In another embodiment, a fluid medium compaction device is provided that provides a shroud to limit fluid loss during compaction by providing a conformable shield between the nozzle and the surface. The shroud could be a flexible "skirt" as in a hovercraft, pins as in a dot-matrix printer, flexible spring members (such as finger springs), or any other suitable means.

Figure 5:
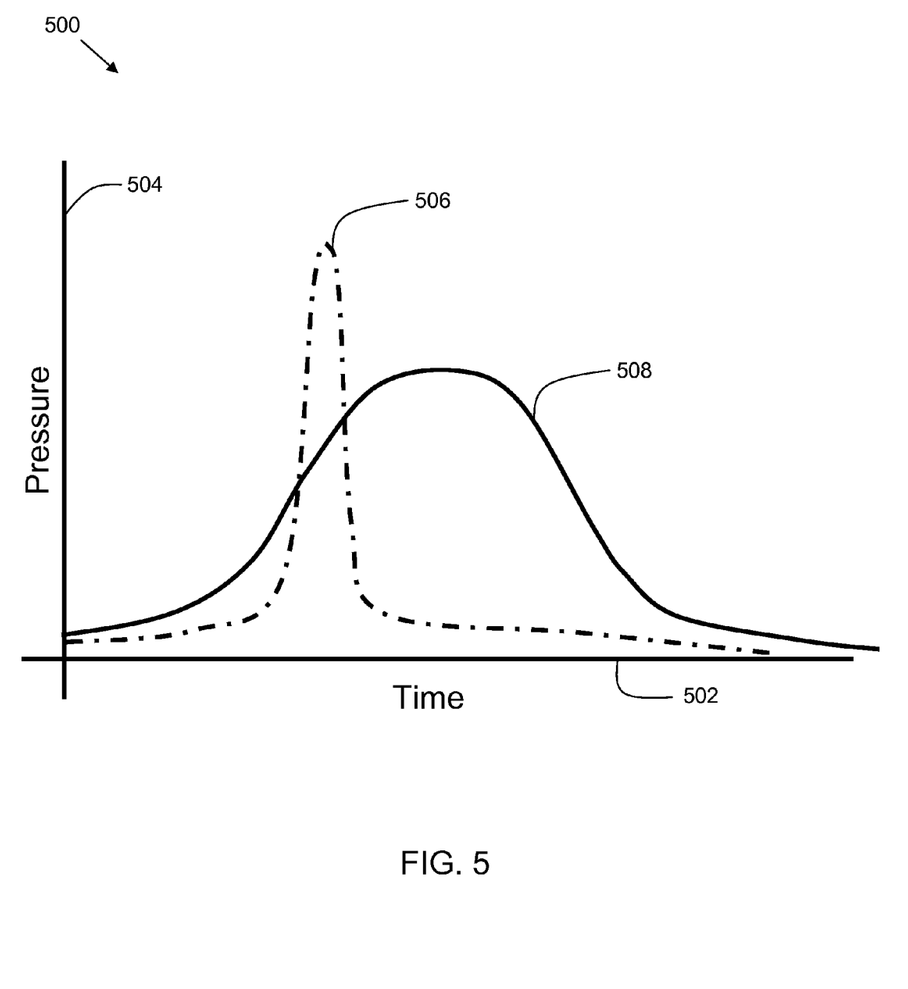
FIG. 5 is a graph indicating the effect of a diffuser.

FIG. 5 is a graph 500 indicating the effect of a diffuser with a pulse detonation engine. Graph 500 comprises a horizontal time axis 502 and a vertical pressure axis 504. Curve 506 shows a function of pressure over time for a PDE without a diffuser. The curve 506 is a narrow and tall pulse. This represents high pressure for a brief time interval. The high pressure can be so high as to dislodge or damage the tape plies as they are being applied. Curve 508 shows a function of pressure over time for a PDE with a diffuser (see 110 of FIG. 1A). Curve 508 shows a shorter, wider pulse, as compared with curve 506. Hence, the diffuser serves to spread out the pulse, such that the peak pressure is less, but the amount of time of the applied pressure increases, as compared to without the diffuser. Embodiments of the present invention may have a controllable diffuser, such that the pressure can be fine tuned as part of the manufacturing process. The controllable diffuser may comprise adjustable valves, ports, or baffles to control the pulse peaks. In one embodiment, the diffuser may be a buffer volume, which is a void placed upstream of the PDE nozzle.

Figure 6:
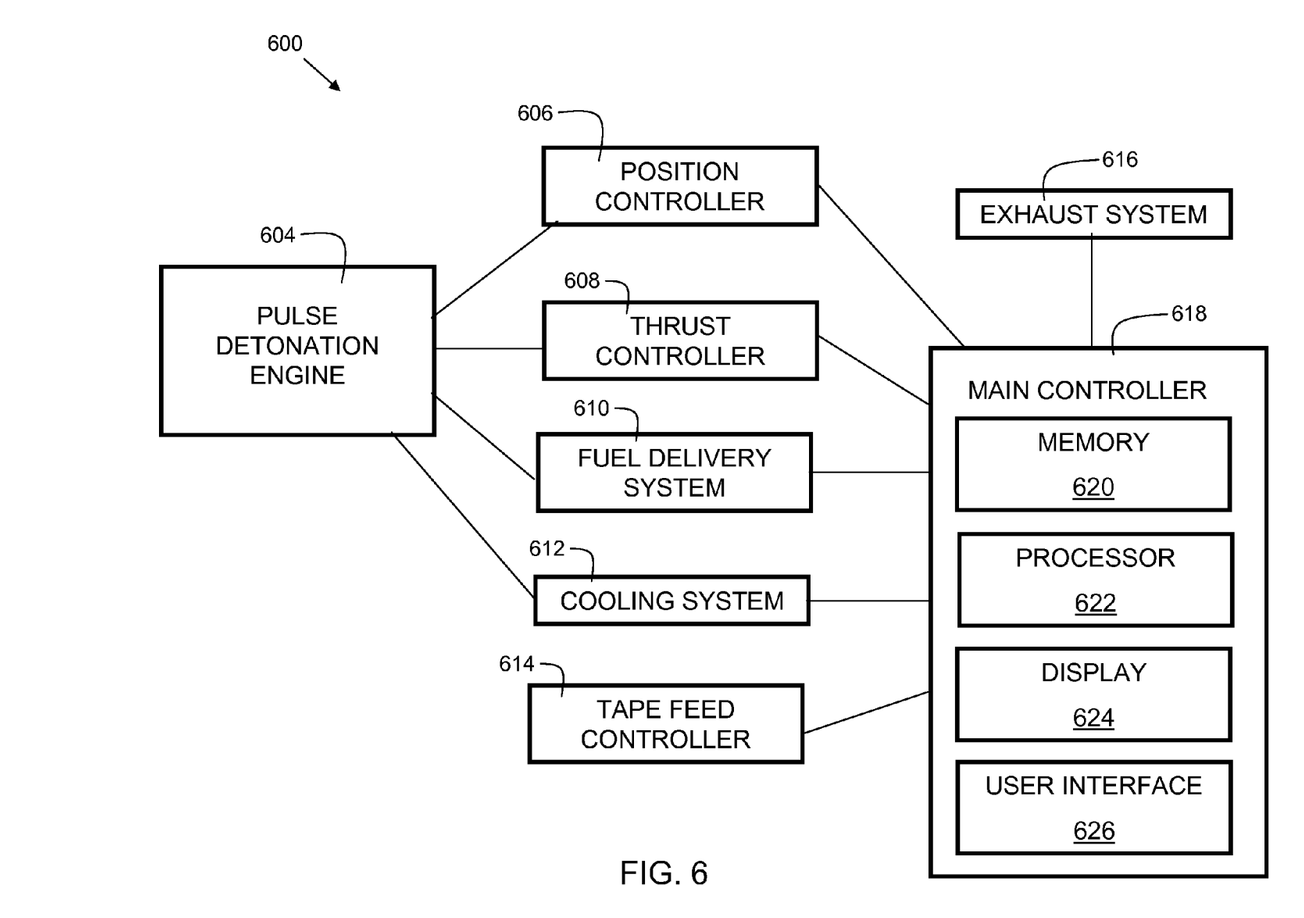
FIG. 6 is a block diagram of a system in accordance with an embodiment of the present invention.

FIG. 6 is a block diagram of a system 600 in accordance with an embodiment of the present invention. System 600 comprises a main controller 618. Main controller 618 may be a general- or special-purpose computer comprising memory 620, and a processor 622 which is configured to read and write memory 620. The memory 620 may be non-transitory memory, such as flash, ROM, non-volatile static ram, or the like. The memory 620 may contain instructions that, when executed by processor 622, control the various subsystems to operate system 600. Main controller 618 may also comprise a display 624 and a user interface 626 for interacting with the system 600. The user interface 626 may comprise a keyboard, touch screen, mouse, or the like. Main controller 618 interfaces with a variety of subsystems of system 600. The position controller 606 controls the position of the pulse detonation engine 604 in relation to the tape ply being applied. The position controller may control the position in the X, Y, and Z dimensions.

A thrust controller 608 allows the user to specify the thrust profile for the pulse detonation engine. The thrust controller 608 may comprise a controllable diffuser to allow for diffusion of the output exhaust pulses (see curve 508 of FIG. 5).

A fuel delivery system 610 controls the fuel supply to the pulse detonation engine 604. A cooling system 612 provides cooling (via circulation of water or other coolant, for example) to the pulse detonation engine 604. A tape feed controller 614 controls the dispensing of thermoplastic tape plies. An exhaust system 616 controls the ventilation of PDE exhaust gases safely away from the system 600, and preferably vents the exhaust gases outdoors.

Figure 7:
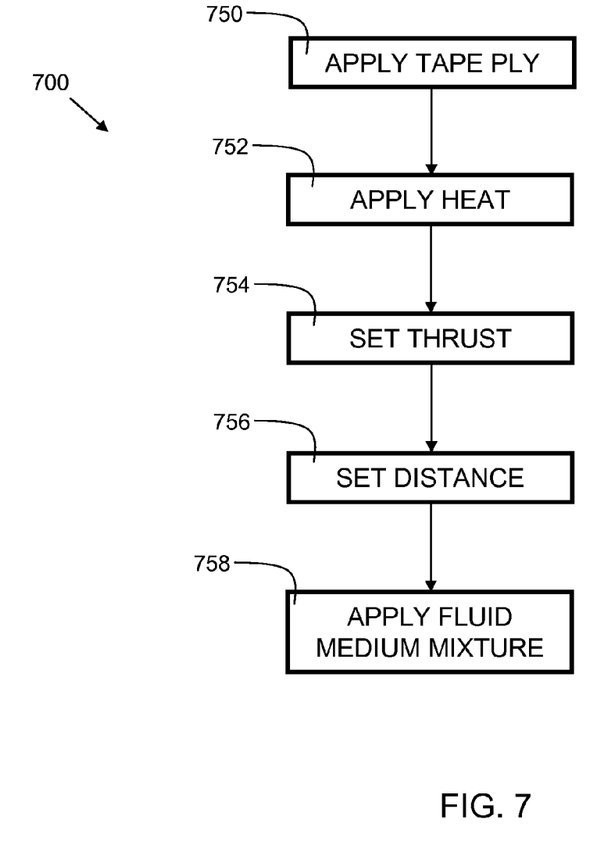
FIG. 7 is a flowchart indicating process steps for a method in accordance with an embodiment of the present invention.

FIG. 7 is a flowchart 700 indicating process steps for a method in accordance with an embodiment of the present invention. In process step 750, tape is applied to a surface (e.g. to a mandrel) for compaction. In process step 752, heat is applied. The applied heat may originate from an external source (see 169 of FIG. 1B), internal source (see 180 of FIG. 1C), or as a byproduct of a PDE (see 128 of FIG. 2). In optional process step 754, the thrust for the PDE may be adjusted. In optional process step 756, the distance between the pressure source (e.g. PDE or compressed gas outlet) may be adjusted. In process step 758, the fluid medium mixture is applied to a tape ply. Note that some of the steps listed in flowchart 700 may be performed in an order other than shown, and optional steps may be omitted without departing from the scope of the present invention.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An apparatus for fabricating thermoplastic composite materials, comprising:

a fluid compaction device, wherein the fluid compaction device is a pulse detonation engine comprising a body and a nozzle, and wherein the pulse detonation engine is configured and disposed to output exhaust gas via the nozzle;

a tape feed mechanism configured and disposed to dispense thermoplastic tape within a force zone of the fluid compaction device, wherein force exerted by the fluid compaction device within the force zone adheres the dispensed thermoplastic tape to an underlying tape layer without direct physical contact between the fluid compaction device and the dispensed thermoplastic tape.

2. The apparatus of claim 1, wherein the fluid compaction device is a compressed gas output nozzle.

3. The apparatus of claim 2, further comprising an external heat source, the external heat source configured and disposed to apply heat to the force zone.

4. The apparatus of claim 2, wherein the fluid compaction device further comprises a heat source.

5. The apparatus of claim 1, wherein the pulse detonation engine further comprises a buffer volume disposed between the body and the nozzle.

6. The apparatus of claim 1, further comprising a shroud disposed around the pulse detonation engine.

7. The apparatus of claim 6, further comprising an exhaust gas removal system configured and disposed to remove the exhaust gas.

8. The apparatus of claim 1, further comprising a Z-axis control mechanism, configured and disposed to move the fluid compaction device in a vertical direction to maintain a predetermined distance between the fluid compaction device and dispensed thermoplastic tape.

9. A fiber placement system for placing a plurality of resin impregnated tape plies onto a mandrel to form a shaped object, comprising:
  a nozzle, wherein the nozzle is connected to an output of a pulse detonation engine;
  at least one delivery tube for providing a fluid medium mixture to the nozzle, wherein the fluid medium mixture comprises a combusted gas mixture,
  wherein the nozzle directs the fluid medium mixture onto a surface of the shaped object, thereby providing pressure on the surface; and
  a heating device for applying heat to the plurality of resin impregnated tape plies.

10. The fiber placement system of claim 9 wherein the pulse detonation engine further comprises a controllable diffuser.

11. A method for fabricating thermoplastic composite materials, comprising:
  applying a first layer of thermoplastic tape to a mandrel;
  applying a second layer of thermoplastic tape on top of the first layer of thermoplastic tape;
  applying heat to the first layer of thermoplastic tape and the second layer of thermoplastic tape; and
  applying a fluid medium mixture to the second layer of thermoplastic tape, thereby compacting the second layer of thermoplastic tape, wherein the fluid medium mixture comprises supersonic plasma.

12. The method of claim 11, wherein applying heat to the first layer of thermoplastic tape and the second layer of thermoplastic tape comprises applying heat via a hot gas torch.

13. A method for fabricating thermoplastic composite materials, comprising:
  applying a first layer of thermoplastic tape to a mandrel;
  applying a second layer of thermoplastic tape on top of the first layer of thermoplastic tape; applying heat to the first layer of thermoplastic tape and the second layer of thermoplastic tape; and
  applying a fluid medium mixture to the second layer of thermoplastic tape, thereby compacting the second layer of thermoplastic tape, wherein the applying the fluid medium mixture comprises applying an exhaust gas via a nozzle of a pulse detonation engine.

* * * * *